Patented Sept. 7, 1926.

1,599,135

UNITED STATES PATENT OFFICE.

WILLIAM HOFFMAN KOBBÉ, OF NEW YORK, N. Y., ASSIGNOR TO TEXAS GULF SULPHUR COMPANY, OF BAY CITY, TEXAS, A CORPORATION OF TEXAS.

METHOD OF IMPROVING THE PROPERTIES OF WOOD.

No Drawing.    Application filed November 24, 1925. Serial No. 71,225.

This invention relates to a method of improving the properties of wood and the provision of an improved wood product.

The invention involves the conversion into a useful product of wood which in its natural condition is comparatively useless. Thus a relatively soft and easily abraded wood is converted into an extremely dense and durable hardwood. Certain species of wood are durable and resistant to wood rot but are too weak mechanically for many purposes. California redwood is an example. Such wood is, by the method of the invention, rendered hard and durable, and thus a new product is obtained, namely redwood which is strong mechanically and effectively resists wear, the quality of hardness being combined with that of exceptional durability. On the contrary, other species of wood are mechanically strong but subject to rapid decay, and, according to the invention, these species are given enduring qualities.

Attempts have been made heretofore to secure these results. For example, it has been proposed to introduce wood into molten sulphur at a temperature sufficiently high to bring about carbonization or charring of at least a portion of the woody structure. I have investigated this treatment of wood and found that it is detrimental to the product desired because the woody structure is changed either wholly or in part to charcoal, and sulphur impregnated charcoal does not possess the strength and other qualities desired. Furthermore, the color of the wood is greatly impaired and the method is wasteful of heat since it involves the maintenance of a sulphur bath at a comparatively high temperature.

It has also been proposed to treat wood by impregnating with creosote oil, various waxes, such as Montan wax, and metallic salts. Such treatment, however, has little, if any beneficial effect upon the strength or wearing qualities of the wood, and has merely the effect of increasing to a certain extent the life or durability of the wood. Moreover, the usual treatment with creosote oil renders the wood unfit for any but a limited number of uses because of the oily surface and undesirable odor which result from such treatment.

The present invention involves the impregnation of wood with sulphur, imparting thereto increased strength, increased resistance to mechanical wear, superior hardness, increased imperviousness to moisture and resistance to decomposition or decay, and generally improving the physical properties of the wood. As a result of an extended investigation which I have carried on for a year or more, I have found that practically all woods may be impregnated by immersion in molten sulphur by a simple open tank treatment, and that the quantity of sulphur absorbed varies within wide limits being largely dependent upon the structure and characteristics of the species.

The use of vacuum and/or pressure expedites the process, but in some cases there is not sufficient increase in quantity of sulphur entering the wood to justify the expense of its employment. Certain species of wood absorb approximately as much sulphur by open tank treatment as would enter the wood under vacuum and pressure. Certain species, which are very resistant to impregnation by open tank treatment are equally difficult to impregnate with vacuum and pressure.

I have found that the specific gravity of wood has little bearing on its permeability. For example, an extremely light wood, such as balsa, may be very resistant to penetration on account of its cellular structure, whereas a heavy wood such as beach or oak may take it up readily through the pores and tracheids.

In my investigations, white pine, sugar or western white pin, red and white palmetto, so-called soft and hard California red wood, poplar, cypress, white wood (Lierodendron tulipifera), hard maple, beech, birch, red oak, white spruce, cedar and other species have been impregnated with sulphur. These include the various types of woody growth such as hardwood or broadleave species, soft woods or conifers, and the palms.

The hard woods and conifers produce their wood by annual increments occurring as spring and summer wood by cellular growth from the cambium layer, whereas the palms produce their woody structure by an entirely different order of growth, vertical bundles of fibres resulting rather than the well known annual rings occurring in the hard woods and conifers.

The woods of most coniferous species contain large resin ducts and where these are not clogged with resin I find that absorption of sulphur is very readily brought about. There is also a marked difference between the sapwood and heartwood of the conifers; the former impregnating much more readily than the latter, although there may be little difference in the structure.

The hardwoods, which are known as ring porous, have large pores through which the sulphur enters the wood structure. In some of the hard woods such as red oak, the pores are mostly in the spring wood of the annual rings, whereas in maple, which is a diffused porous wood, the pores are uniformly scattered through the entire width of the annual ring. In certain species these pores are frequently clogged with tylosis and I have found that under such circumstances it is extremely difficult to bring about sulphur penetration.

Generally speaking, there is therefore very little difference, as far as penetration is concerned, between the two general classes of woods, hardwoods and conifers, because in both classes a number of very resistant species occur. For example, sap wood from practically any pine, if the ducts are free or comparatively free of resin, will absorb more sulphur than a ring porous hardwood in which the pores contain much tylosis. On the other hand, a ring porous hardwood may show a much higher degree of absorption than a piece of pine wood taken from the heart of the tree. Even a very light wood, which offhand would appear to be extremely porous, such as white spruce, balsa wood or palmetto may be surprisingly resistant to penetration. This is undoubtedly the case with spruce, and I have found that palmetto absorbs but little more sulphur than white pine.

In carrying out the invention, I immerse the wood and hold same beneath the surface of the sulphur bath, which is maintained at a temperature of 140° to 150° C. for the first five or six hours, or until all evidence of moisture has disappeared. It is then advisable to allow the temperature to drop to 120° or 125° for the remainder of the time or four or five hours, when the wood is removed. The extent of penetration is generally evidenced by the buoyancy of the wood in the sulphur bath and complete cessation of bubbling. A fully impregnated piece of white pine will expose only about one-fifth of its volume above the surface of the sulphur and will, of course, sink in water.

The period of immersion depends upon many factors, but in general I leave the various woods in for not less than ten or twelve hours and in some cases double this time has little effect upon the total quantity absorbed. A readily impregnated wood may require only four or five hours but in all investigations to date, an effort has been made to secure maximum impregnation irrespective of the time element, in order to determine just what woods may be treated by open tank methods and the portion of the tree best adapted for this treatment.

An important feature in my process is temperature control and time element. I maintain the temperature of the molten sulphur bath between about 120° C. and about 150° C. and have discovered that it is entirely unnecessary and quite undesirable to carbonize or even partially carbonize the wood in order to produce a material which sulphur will penetrate. The woody material of the wood is hence, in my improved method, left chemically unchanged by the presence of the sulphur in the pores.

Another important element in my process is the use of seasoned, or properly dried, wood, because the presence of moisture inhibits penetration of sulphur and when in excess, prevents the entry of practically any sulphur. This may be explained by the fact that it is difficult for the sulphur to enter the tracheids, pores or resin ducts while moisture is being driven off in the form of steam, and in addition, the conversion of water to steam requires a certain number of heat units and has a tendency to lower the temperature of the woody mass, with constant cooling of the molten sulphur in immediate contact with the wood.

I have found that dry white pine, especially the sapwood, absorbs several times its own weight of sulphur and, when impregnated, consists of as much as 60–70% by weight of sulphur based upon the final weight of the treated wood. California redwood absorbs approximately its own weight of sulphur, while Florida palmetto absorbs about the same as white pine, or from 60–70%, but requires a much longer period of immersion. The other species of wood mentioned in this specification absorb anywhere from 5 or 6% up to 50% or more, depending upon the conditions and structure of the wood.

The effect of the treatment on the wood is to indurate and strengthen it. Under compression parallel to the grain untreated pine withstood under test a maximum load of 3,500 lbs. per square inch, whereas pine treated with sulphur required 5,800 lbs. per square inch to bring about failure. The treated wood is also much more resistant to impact and is several times harder than the untreated. If untreated hemlock is taken at 100, a sulphur treated piece has a hardness under test of 300 to 350.

Sulphur being an insoluble solid at ordinary temperatures, the effect of my treatment is different from that brought about by the use of any other impregnant. Creosote does not change its form after entering the wood, nor do the various waxes such as Montan wax, or the metallic salts similarly employed unless such salts enter the wood in the form of a solution. On the other hand, my treatment injects an elemental fluid into the wood which becomes a crystalline solid and this change is so rapid that the surface pores are almost immediately closed through solidification of the sulphur and "kick-back" such as occurs with other materials, is prevented. For example, when creosote oil is forced into wood under pressure, and this pressure is removed, a portion of the oil exudes from the wood because there is nothing to counteract the internal pressures. In my process, the rapid solidification of the sulphur on the surface and particularly at the ends of the treated wood, immediately seals the pores and prevents the loss of the molten sulphur contained within the woody structure.

Although not in itself toxic, sulphur acts as a preservative of the wood in that it excludes and prevents the entry and action of all destructive agencies. In order to bring about wood rot, the presence of heat, moisture and oxygen are necessary and the sulphur excludes at least two of these factors. In other words, it preserves the wood physically rather than by chemical means and isolates it from the action of wood rot fungi.

Since the treatment makes wood very much harder and the more durable, it serves to protect it from mechanical abrasion and destruction. In short, my present process converts a soft and possibly useless wood into a very dense and durable hardwood. Sulphur also imparts many other desirable qualities to wood such as acid resistance, high dielectric strength and a "case hardened" surface which is subject to a high finish and polish.

There are many practical applications for this sulphur indurated wood in the arts and industry. It may be used for the manufacture of bowling balls, tool handles, agricultural implement parts, automobile and other wheel-spokes, paving and flooring block, railway ties, posts, poles and standards, telegraph cross arms, insulator cobs, pins and dowels, cooperage, box shooks, silo staves and for the construction of acid and other tanks.

This invention is not limited to wood which is fully impregnated with sulphur, since partial impregnation is often desirable. In the case of bowling balls or acid resistant tanks, it may be desirable to impregnate the wood as completely as possible either by open tank treatment or with vacuum and/or pressure, because it is essential to bring about maximum chemical resistance. Flooring block, however, should as a rule be only treated on the immediate surfaces and this may be accomplished by controlling the time of immersion. For example, California redwood is extensively used as a flooring material in the form of blocks, which are set in an asphaltic mastic, or other cementing medium. These blocks are very desirable for flooring since they are not subject to rot and are attractive in appearance. Their principal defect, however, is their softness and their lack of ability to withstand wear and abrasion. By treating in accordance with my process, these California redwood floor blocks may be "case-hardened" or indurated for an appropriate depth on all sides and faces say for one quarter of an inch, and in this way, materially hardened without a marked increase in weight.

The same explanation applies to certain railway ties. As is well known, California redwood will last almost indefinitely in the ground but it cannot be used for railroad ties under heavy traffic because the rails, either with or without tie plates, ultimately cut into and destroy the tie long before the center portion has deteriorated in any way. By treating the ends or the entire tie with sulphur this tendency to rail cutting may be entirely obviated.

The treatment of railway ties is, of course, not limited to redwood, but may be used on any other species where it is desired to indurate and make more durable, both physically and chemically. These sulphur treated ties will hold spikes much better than the untreated, and the process may be carried out in the usual creosoting cylinders now employed so extensively for injecting creosote oil into ties.

As far as appearance is concerned, my treatment has many advantages over creosote or any other medium which might be similarly employed. Sulphur changes the natural color of the wood but little, and since it acts as a filler, the surface may be given any of the usual finishes and also painted, shellacked, varnished or lacquered. It is also possible to add sulphur soluble dyes, as mentioned in my co-pending application, S. N. 61,831, filed October 10, 1925, and thus inject permanent coloring matter. For example by the use of nigrosine base a piece of redwood may be converted into a material which has all the appearance and weight of ebony.

I claim:

1. The method of treating wood which comprises immersing the wood in a sulfur bath at a temperature in excess of that required to maintain the sulfur in a molten state but materially below the boiling point of the sulfur maintaining the wood in such bath for a sufficient time to effect the removal of substantially all of the moisture content of the wood and subsequently reducing the temperature of the bath to almost the melting point of sulfur until the wood is impregnated to the desired extent at this lower temperature.

2. The method of treating wood which comprises immersing the wood in its natural state in a sulfur bath at a temperature in excess of that required to maintain the sulfur in a molten state but materially below the boiling point of the sulfur, maintaining the wood in such bath for a sufficient time to effect the removal of substantially all of the moisture from the pores of the wood, then reducing the temperature of the bath to about the melting point of sulfur until the pores of the wood have become filled with sulfur to the desired extent at this lower temperature and then permitting the sulfur to congeal within said pores.

3. The method of treating wood which comprises immersing the wood in a sulfur bath at a temperature of about 140°–150° C. until substantially all of the moisture content of the wood has been driven off and then reducing the temperature of the bath to about 120°–125° C. and permitting the wood to become impregnated to the desired extent at this lower temperature.

4. The method of treating wood which comprises immersing the wood in its natural state in a sulfur bath at a temperature of about 140°–150° C. until substantially all of the moisture content has been driven from the pores of the wood then reducing the temperature of the bath to about the melting point of sulfur and permitting the pores of the wood to become filled to the desired extent at this lower temperature and then permitting the sulfur to congeal within said pores.

In testimony whereof I affix my signature.

WILLIAM HOFFMAN KOBBÉ.